(12) United States Patent
Lei et al.

(10) Patent No.: US 10,616,176 B2
(45) Date of Patent: Apr. 7, 2020

(54) VIRTUAL DNS RECORD UPDATING METHOD FOR DYNAMIC IP ADDRESS CHANGE OF VEHICLE HOSTED SERVER

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 295 days.

(21) Appl. No.: 15/160,727

(22) Filed: May 20, 2016

(65) Prior Publication Data
US 2017/0339095 A1 Nov. 23, 2017

(51) Int. Cl.
| | |
|---|---|
| H04L 29/12 | (2006.01) |
| H04L 29/08 | (2006.01) |
| H04W 4/44 | (2018.01) |
| H04W 4/14 | (2009.01) |
| H04L 12/24 | (2006.01) |

(52) U.S. Cl.
CPC .......... H04L 61/1511 (2013.01); H04L 41/12 (2013.01); H04L 61/2007 (2013.01); H04L 61/2076 (2013.01); H04L 67/12 (2013.01); H04L 67/141 (2013.01); H04W 4/14 (2013.01); H04W 4/44 (2018.02)

(58) Field of Classification Search
CPC . H04L 61/1511; H04L 41/12; H04L 61/2007; H04L 61/2076; H04L 67/12; H04L 67/141; H04W 4/14
See application file for complete search history.

(56) References Cited

U.S. PATENT DOCUMENTS 9,754,425 B1* 9/2017 Iqbal ................. G07C 5/008
9,756,669 B2* 9/2017 Das ................... H04W 76/12
(Continued)

FOREIGN PATENT DOCUMENTS

WO 2007117370 A1 10/2007
WO WO-2007117370 A1 * 10/2007 ............. G07C 5/008

OTHER PUBLICATIONS

Dynamic DNS Update Client (DUC) for Windows. Retrieved from http://www.noip.com on Feb. 15, 2016.
(Continued)

Primary Examiner — Uzma Alam
(74) Attorney, Agent, or Firm — Michael J. Spenner; Brooks Kushman P.C.

(57) ABSTRACT

A system includes a vehicle modem; a storage maintaining paired device data including phone numbers of mobile devices; and a web server installed to a telematics control unit connected to a vehicle bus. The web server identifies a change in a network address of the vehicle modem, and in response, sends the changed network address to the mobile devices using short message service (SMS) messages addressed to the phone numbers of the mobile devices. A mobile device identifies a web request as including a hostname of a vehicle; accesses a virtual domain name server of the device to determine whether the mobile device locally maintains a network address for the hostname; if so, initiates a web connection to the network address, and if not, initiates the web connection using a network address resolved from the hostname via a remote domain name server.

12 Claims, 10 Drawing Sheets

(56) References Cited

U.S. PATENT DOCUMENTS

| | | | | |
|---|---|---|---|---|
| 2009/0077267 A1* | 3/2009 | Alrabady | ................ | H04L 67/34 |
| | | | | 709/249 |
| 2010/0114488 A1* | 5/2010 | Khamharn | ............ | B60R 25/102 |
| | | | | 701/300 |
| 2011/0106919 A1* | 5/2011 | Mazur | ............... | H04L 29/12066 |
| | | | | 709/220 |
| 2015/0058488 A1* | 2/2015 | Backholm | ........... | H04L 61/1511 |
| | | | | 709/226 |
| 2016/0070527 A1* | 3/2016 | Ricci | ....................... | G06F 3/165 |
| | | | | 715/716 |
| 2017/0187863 A1* | 6/2017 | Chen | ....................... | H04L 67/12 |
| 2017/0339210 A1* | 11/2017 | Hendi | .................... | H04L 67/08 |

OTHER PUBLICATIONS

IP Watcher 3.0.0.30—Monitor IP Address for Changes. Retrieved from http://www.gearboxcomputers.com/products/ip-watcher/ on Feb. 15, 2016.

IP Watcher Image Gallery. Retrieved from http://www.gearboxcomputers.com/products/ip-watcher/image-gallery/ on Feb. 15, 2016.

Free Dynamic DNS—Tired of Remembering Your Dynamic IP Address? Retrieved from http://www.noip.com/ on Feb. 15, 2016.

* cited by examiner

VIRTUAL DNS RECORD UPDATING METHOD FOR DYNAMIC IP ADDRESS CHANGE OF VEHICLE HOSTED SERVER

TECHNICAL FIELD

Aspects of the disclosure generally relate to updating of virtual domain name service records for vehicle-hosted web servers.

BACKGROUND

Remote vehicle service requests, such as door lock and unlock, may be passed through a backend telematics server. The backend telematics server receives the service request and issues a control command to the telematics control unit of the vehicle. The command may be issued over a cellular communication channel to the telematics control unit of the vehicle. The backend telematics server may be operated by the automobile manufacturer and may be associated with ongoing operational and maintenance costs to the manufacturer.

Once the vehicle is sold to a customer, it may be difficult to add new features to the telematics control unit of the vehicle. Even though new features may be implemented through a software update applied over the air to the telematics control unit, the development and testing costs to add the new features to the backend telematics server may be significant, as the changes may affect a large number of vehicles in the field.

SUMMARY

In one or more illustrative embodiments, a system includes a vehicle modem; a storage maintaining paired device data including phone numbers of mobile devices; and a web server installed to a telematics control unit, the web server programmed to identify a change in a network address of the vehicle modem, and in response, send the changed network address to the mobile devices using short message service (SMS) messages addressed to the phone numbers of the mobile devices.

In one or more illustrative embodiments, a system includes a mobile device programmed to identify a web request as including a hostname of a vehicle; access a virtual domain name server of the device to determine whether the mobile device locally maintains a network address for the hostname; if so, initiate a web connection to the network address, and if not, initiate the web connection using a network address resolved from the hostname via a remote domain name server.

In one or more illustrative embodiments, a method includes initiating a web connection by a mobile device to a network address of a web server of a vehicle by identifying a hostname of a web request as being a vehicle hostname and accessing a virtual domain name server of the mobile device to identify the network address for the hostname.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A telematics scheme may be implemented without use of a backend telematics server. Instead, a telematics control unit (TCU) of a vehicle may utilize an on-board web server to control telematics functions according to network traffic directed to the vehicle. The onboard web server may monitor incoming network traffic for network connections from mobile devices. In an example, the network connection may be a cellular connection over a cellular communications network. In another example, the network connection may be a local connection between the mobile device and the vehicle, such as over a Wi-Fi network.

A mobile application installed to the user's mobile device may be used to display an access portal hosted by the web server. In an example, the mobile application may be a web browser application. In another example, the mobile application may be an application specially-configured to interact with on-board vehicle web servers. In yet another example, the web server may initiate a network connection to the mobile device. The access portal may allow the user to select telematics functions to be performed or to execute applications installed to the web server. In an example, the user may use the portal to select a key fob application, and from the key fob application request that a "door unlock" command be performed by the vehicle. To perform a telematics function, a remote service request may be sent from the user's mobile device over the network connection to the web server of the telematics control unit.

Requesting a cellular network operator to assign static Internet protocol (IP) or other addresses to vehicle modems may be difficult and/or costly. Thus, as the vehicle travels, the IP or other address that the modem of the vehicle is assigned from the cellular network may change. Additionally, accessing the vehicle web server by IP address may be difficult for a user of a mobile device to perform. Instead, it may be more convenient for the user to be able to use a host name to access the web server (e.g., www.Dan-ford-F150.ford.com) instead of the dynamic IP address. To keep the domain name system (DNS) records in line with the current vehicle address, responsive to the IP address of the modem changing the TCU may automatically submit a DNS (Domain Name System) record change to the domain name's zone file on the Internet. However, DNS address updates may take up to 48 hours for those updates to propagate throughout the Internet. During this period, the user will receive an error while using the vehicle host name that still maps to an out-of-date IP address.

To allow for the mobile devices to continue to access the TCU despite IP address changes, the TCU may maintain a list of paired mobile phones used to access the web server and their corresponding cell phone numbers. When the TCU detects change in the cellular connection IP address of the vehicle, the TCU may sends a SMS message to all the mobile devices included in the list, notifying the devices of the new IP address of the vehicle. The TCU may also updates the DNS records to the domain zone file as normal DNS record update.

A virtual DNS server application installed to the user's mobile device may act as a virtual DNS server, and may monitor and maintains IP address mapping overrides for vehicle-specific hostname URLs (e.g., for www.Dan-ford-F150.ford.com in this example). Responsive to the mobile device receiving the SMS message, the virtual DNS server updates the IP address mapping to map the vehicle hostname URL to the new IP address. When the user browses to the vehicle URL, the virtual DNS server automatically redirects the URL to the current vehicle IP address. To the user, it appears that the DNS record has been changed on the Internet. Accordingly, the vehicle may continue to be accessible to the mobile device despite the actual DNS record change not having been completed. In this way, the user can always access the vehicle hosted web server with the host name URL despite the vehicle web server being available at a dynamic IP address.

Figure 1:
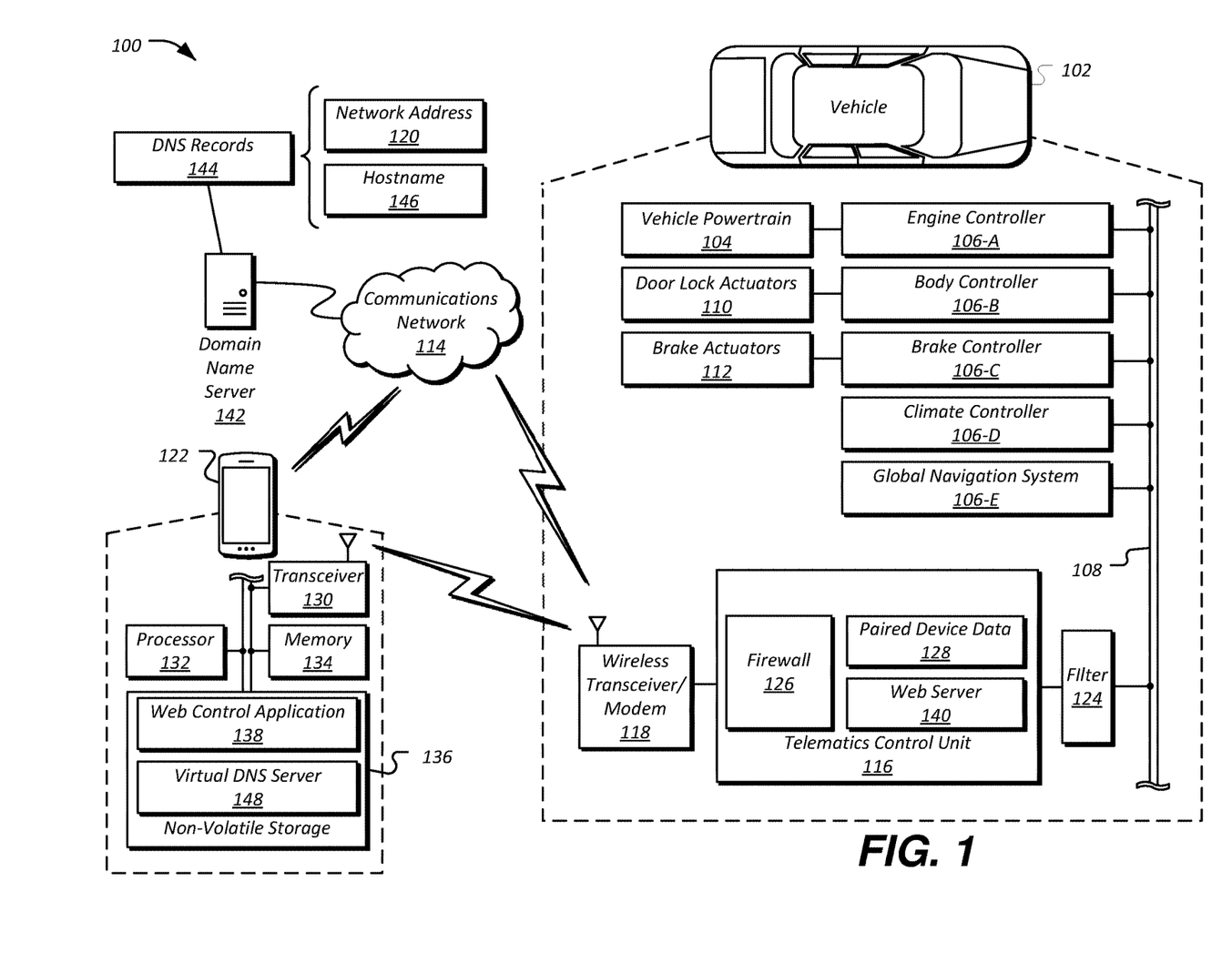
FIG. 1 illustrates an example system including a vehicle having an on-board web server controllable by a remote service application of a mobile device.

FIG. 1 illustrates an example system 100 including a vehicle 102 having an on-board web server 140 controllable by a web control application 138 of a mobile device 122. As illustrated, the vehicle 102 includes a vehicle powertrain 104 connected to one or more vehicle wheels to propel the vehicle 102. The vehicle 102 also includes a plurality of vehicle ECUs 106 in communication over one or more vehicle buses 108 to control the vehicle powertrain 104 and other vehicle 102 functions, such as a vehicle door lock actuators 110 or brake actuators 112. The vehicle 102 also includes a telematics control unit 116 having a firewall 126 and configured to communicate with paired mobile devices 122 via a wireless transceiver/modem 118. The telematics control unit 116 may also be connected to the vehicle bus 108 through a filter 124. The system 100 also includes a mobile device 122 having a web control application 138 and a virtual DNS server 148 and capable of communication over a communications network 114 with the vehicle 102 with a domain name server 142 storing DNS records 144. The vehicle 102 may be configured maintain paired device data 128 including phone numbers of mobile devices 122 to allow the vehicle 102 to send messages to the mobile devices 122 specifying the current network address on the communications network 114 of the web server 140. While an example system 100 is shown in FIG. 1, the example components illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane or other mobile machine for transporting people and/or goods. The vehicle powertrain 104 may include one or more engines or motors configured to supply the motive force to propel the vehicle 102. In an example, the vehicle 102 may be powered by an internal-combustion engine coupled to the drive wheels via a transmission to a differential. In another example, the vehicle 102 may be a hybrid electric vehicle (HEV) powered by both an internal combustion engine and one or more electric motors, such as a series hybrid electric vehicle (SHEV), a parallel hybrid electrical vehicle (PHEV), a parallel/series hybrid electric vehicle (PSHEV), or a compressed natural gas (CNG) engine vehicle. As the type and configuration of vehicle 102 may vary, the capabilities of the vehicle 102 may correspondingly vary. As some other possibilities, vehicle 102 may have different capabilities with respect to cargo capacity, passenger capacity, and towing ability.

The vehicle 102 may include a plurality of electronic control units (ECUs) 106 configured to perform and manage various vehicle 102 functions under the power of the vehicle battery and/or drivetrain. As depicted, the example vehicle ECUs 106 are represented as discrete ECUs 106-A through 106-F. However, the vehicle ECUs 106 may share physical hardware, firmware, and/or software, such that the functionality from multiple ECUs 106 may be integrated into a single ECU 106, and that the functionality of various such ECUs 106 may be distributed across a plurality of ECUs 106. The vehicle ECUs 106 may include various vehicle 102 components configured to receive updates of associated software, firmware, or configuration settings.

As some examples, an engine controller ECU 106-A may be configured to provide for monitoring and control of the vehicle powertrain 104. A body controller ECU 106-B may manage various power control functions such as exterior lighting, interior lighting, keyless entry, door lock actuators 110 to lock and unlock vehicle doors, remote start, and point of access status verification. A brake controller 106-C may be configured to communicate brake actuators 112 or other vehicle 102 safety systems. A climate controller ECU 106-E may be configured to provide control of heating and cooling system components (e.g., compressor clutch, blower fan, temperature sensors, etc.) to manage climate in cargo and/or passenger compartments. A global navigation satellite system (GNSS) controller ECU 106-F may be configured to provide vehicle location information using a system such as the U.S. global positioning system (GPS), the European Galilleo system, the Russian GLONASS system or the Chinese Compass/Beidou system.

The vehicle bus 108 may include various methods of communication available between the vehicle ECUs 106. As some non-limiting examples, the vehicle bus 108 may include one or more of a vehicle controller area network (CAN), an Ethernet network, and a media oriented system transfer (MOST) network.

The telematics control unit 116 may be configured to provide telematics services to the vehicle 102. These services may include, as some non-limiting possibilities, navigation, turn-by-turn directions, vehicle health reports, local business search, accident reporting, and hands-free calling. To support these and other telematics services, the telematics control unit 116 may utilize network hardware configured to facilitate communication between the vehicle ECUs 106 and with other devices of the system 100. The telematics control unit 116 may also include computing hardware in support of the performance of the functions of the telematics control unit 116 discussed herein. This computing hardware may include, as some possibilities, one or more processors configured to execute instructions loaded to a memory from a storage medium.

The telematics control unit 116 may utilize the modem services of a wireless transceiver 118 for communication over the communications network 114. When connected to the communications network 114, the wireless transceiver 118 may be assigned a network address 120. In an example, the routable network addresses 120 may include Internet Protocol version 6 (IPv6) addresses or Internet Protocol version 4 (IPv4) addresses. The network addresses 120 assigned to the telematics control units 116 may be unique across the communications network 114. For instance, the network address 120 may be an IP address assigned to the telematics control unit 116 from a pool of available addresses by a dynamic host configuration protocol (DHCP) server of the communications network 114. The IP address may be assigned to the telematics control unit 116 for a specific duration of time, sometimes referred to as a lease, after which the address is revoked and returned to the pool. In such examples, the network address 120 of the telematics control unit 116 may change over time. As another possibility, when the vehicle 102 travels from area to another (e.g., roaming from one carrier to another, from one geographic area to another), the network operator may assign the vehicle 102 to a different network address 120.

The wireless transceiver 118 may include network hardware configured to facilitate communication over the communications network 114 between the vehicle 102 and other devices of the system 100. The communications network 114 may include one or more interconnected communication networks such as the Internet, a satellite link network, a local area network, a wide area network, a wireless local area network (WLAN) including dedicated short range communication (DSRC), a cellular network, and a telephone network, as some non-limiting examples. Additionally, the wireless transceiver 118 may be configured to communicate over one or more of Bluetooth, Wi-Fi, and wired USB with a mobile device 122 of a user.

To ensure secure functional separation of the telematics control unit 116 from the vehicle bus 108 communications of the vehicle ECUs 106, the telematics control unit 116 may be configured to send remote commands to the vehicle bus 108 through a filter 124. The filter 124 may implement a command validator to prevent commands from being requested by the web control application 138 that could place the vehicle 102 in a state inappropriate for the performance of repair or diagnostic actions, such as filtering out requests commanding an electric vehicle 102 to switch out of Park, releasing a parking brake, commanding a park-pawl actuator, or other operations related to putting the vehicle 102 in a motive or potentially motive state.

The firewall 126 may implement address filtering to prevent commands from being requested by the web control application 138 of an illegitimate mobile device 122. The firewall 126 may accordingly implement validation functionality, such as mobile device 122 certificate verification, to ensure that connected mobile devices 122 are authorized to use the telematics control unit 116 functionality of the vehicle 102.

A mobile device 122 may undergo a process the first time the mobile device 122 is connected to the telematics control unit 116, in which the telematics control unit 116 scans for mobile devices 122, and the user manually confirms an identification of the mobile device 122 to be connected to the telematics control unit 116. This process may be referred to as pairing. The telematics control unit 116 may maintain paired device data 128 indicating device identifiers or other information regarding mobile devices 122 that have been previously paired with the telematics control unit 116. The device data 128 may indicate, for example, the unique device identifiers of mobile devices 122 previously paired with the telematics control unit 116 of the vehicle 102 (e.g., phone numbers, IMEI data, etc.), secret information shared between the paired mobile device 152 and the telematics control unit 116 such as link keys, and/or personal identification numbers (PINs), and most recently used or device priority information, such that the telematics control unit 116 may automatically reconnect to the mobile devices 122 matching data in the paired device data 128 without user intervention. Accordingly, once the pairing process is performed, the telematics control unit 116 may utilize the paired device data 128 to automatically reconnect to the mobile device 122 when the mobile device 122 is identified via the wireless transceiver 118 as being in proximity of the telematics control unit 116.

The mobile devices 122 may be any of various types of portable computing devices, such as cellular phones, tablet computers, smart watches, laptop computers, portable music players, or other devices capable of communication over the communications network 114. In an example, the mobile devices 122 may communicate with the communication network 114 and with the wireless transceiver 118 of the vehicle 102 using a modem or transceiver 130. The mobile devices 122 may include one or more processors 132 configured to execute instructions of mobile applications loaded to a memory 134 of the mobile device 122 from storage medium 136 of the mobile device 122. The web control application 138 may be an example of a mobile application installed to the mobile device 122. The web control application 138 may be configured to receive input (e.g., user input to a user interface of the mobile device 122), and send commands to the vehicle 102 via the telematics control unit 116, as discussed in greater detail below.

The web server 140 may include various types of computing apparatus including a memory on which computer-executable instructions may be maintained, where the instructions may be executable by one or more processors of the computing device. The web server 140 may be configured to maintain an access portal accessible to mobile devices 122 over the communication network 114. In an example, the web server 140 may be configured to provide the access portal to devices connected to the web server 140 via the wireless transceiver 118. As another possibility, the web server 140 may execute a server application that may be accessed by a dedicated client application of a connecting mobile device 122. Accordingly, the access portal of the web server 140 may provide a user interface to the mobile devices 122 allowing the mobile devices 122 to request telematics commands.

The web server 140 may perform authentication of the mobile device 122 to ensure that the mobile devices 122 have permission to access the provided user interface. If the authentication is successful, the web server 140 may send the requested telematics commands (e.g., a "door unlock" command in an example) to the vehicle bus 108 for routing and processing. The web server 140 may also send command results to the mobile device 122 responsive to the command request.

The domain name server 142 may be configured to maintain DNS records 144 associating hostnames 146 with the network addresses 120. The hostnames 146 may refer to a name assigned to the vehicle 102 that is used to identify the vehicle 102 by name rather than by network address 120. For instance, the hostnames 146 may be named in a predefined format using information regarding the vehicle 102 being accessed. For instance, the hostnames 146 may be defined as subdomains of a vehicle-specific top-level domain, or URLs referencing a location at a top-level domain specific to web servers 140 of vehicles 102. As an example, a hostname 146 for a vehicle 102 may be www-.Dan-ford-F150.com. For example, the user may register the vehicle 102 using a domain registration service using a hostname 146 of the user's choice. In some examples, as a part of the pairing process of the mobile device 122 to the vehicle 102, the mobile device 122 may receive the hostname 146 from the vehicle 102.

The domain name server 142 may include various types of computing apparatus, such as a computer workstation, a server, a desktop computer, a virtual server instance executed by a mainframe server, or some other computing system and/or device. Each of these devices may generally include a memory 134 on which computer-executable instructions may be maintained, where the instructions may be executable by one or more processors 132 (only one of which is shown for clarity). Such instructions and other data may be stored using a variety of computer-readable media. A computer-readable medium (also referred to as a processor-readable medium or storage 136) includes any non-transitory (e.g., tangible) medium that participates in providing data (e.g., instructions) that may be read by a computer (e.g., by the processor 132 of the domain name server 142 or mobile device 122). In general, processors 132 receive instructions, e.g., from the memory 134 via the computer-readable storage medium 136, etc., and execute these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C #, Objective C, Fortran, Pascal, Visual Basic, Java Script, Perl, Python, PL/SQL, etc.

The mobile device 122 may access the domain name server 142 to determine the network address 120 of the vehicle 102 based on the hostname 146 of the vehicle 102. In an example, the web control application 138 may send the hostname 146 of the web server 140 of the vehicle 102 to the domain name server 142. The domain name server 142 may access the DNS records 144 to look up the hostnames 146, and may return the vehicle network address 120 associated with the hostname 146 to the mobile device 122.

To keep the DNS records 144 of the domain name server 142 in line with the current network address 120 of the vehicle 102, responsive to the network address 120 of the modem 118 changing, the telematics control unit 116 may automatically send a DNS record change message over the communications network 114 to the domain name server 142. The DNS record change message may indicate the new network address 120 of the vehicle 102 and the hostname 146 of the vehicle 102. Responsive to receipt by the domain name server 142, the domain name server 142 may update the network address 120 associated with the hostname 146 of the vehicle 102. However, DNS address updates may take hours or days to propagate through the Internet. During this period of propagation, a mobile device 122 accessing the domain name server 142 may receive an incorrect network address 120 of the vehicle 102.

The virtual DNS server application 148 may be installed to the mobile device 122 to act as a virtual DNS server. The virtual DNS server application 148 may be configured to maintain vehicle hostname 146 to network address 120 mapping overrides for vehicle-specific hostnames 146. For instance, the virtual DNS server application 148 may update the hosts file or other mechanism of the mobile device 122 used to map hostnames to IP addresses local to the mobile device 122.

To keep the virtual DNS server application 148 records in line with the current network address 120 of the vehicle 102, responsive to the network address 120 of the modem 118 changing, the telematics control unit 116 may automatically send a DNS record change message over the communications network 114 to the mobile device 122. This message may be sent over SMS to not require an Internet connection, and may include an encoding of the new network address 120 for the vehicle 102. The virtual DNS server application 148 may operate such that responsive to the mobile device 122 receiving the SMS message, the virtual DNS server application 148 updates the network address 120 mapping to map the vehicle hostname 146 to the new network address 120.

To save battery charge or to meet key-off load requirements, the web server 140 may discontinue operation during certain conditions, such as when the vehicle 102 is off. In some cases, the user of the mobile device 122 may desire to send a web command request when the web server 140 is in a deactivated state. To re-active the web server 140, the mobile device 122 may send a wake-up message to the telematics control unit 116 of the vehicle 102. For instance, the mobile device 122 may attempt to form a network connection to the web server 140 of the vehicle 102, and if the web server 140 does not respond within a predetermined timeout period, the mobile device 122 may send the wake-up message to the vehicle 102. In an example, the wake-up message may be a short message service (SMS) message sent to a phone number or other identifier of the wireless transceiver 118 over a cellular connection (i.e., other than the network address 120). Responsive to receipt of the wake-up message, the telematics control unit 116 may wake up the on-board web server 140. The telematics control unit 116 may further send a return message over SMS in response to the wake-up message, e.g., when the web server 140 is re-activated and available for use. The return message may include the current network address of the web server 140. Upon receipt of the return message, the mobile device 122 may again initiate the access the web server 140.

By using the web server 140, the operational and maintenance costs of managing a backend telematics server may be avoided. For example, the telematics control unit 116 web server 140 software may be updated, e.g., via a downloaded update adding new features, without affecting the functionality of other vehicles 102 in the field. Moreover, third parties may be able to utilize the services of the on-board web server 140 to install custom applications to the telematics control unit 116 to provide diagnostic data to the customer. For instance, the user may browse and install applications to the web server 140 similar to installation of applications to the mobile device 122.

Figure 2A:
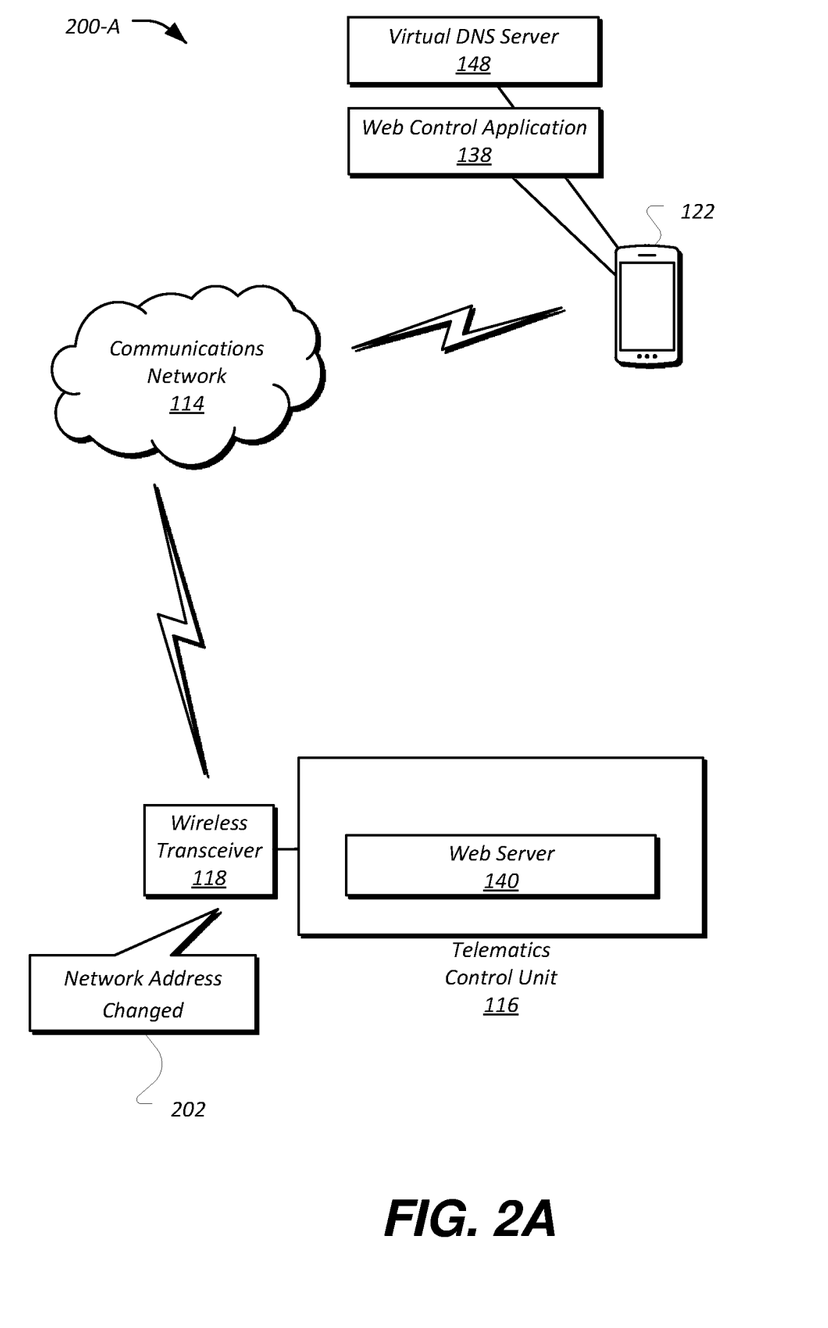
FIG. 2A illustrates an example diagram of the telematics control unit identifying a change in the network address of the vehicle.

FIG. 2A illustrates an example diagram 200-A of the telematics control unit 116 identifying a change 202 in the network address 120 of the vehicle 102. In an example, the telematics control unit 116 may query the current network interface status of the wireless transceiver/modem 118 to determine whether the network address 120 has changed. The querying may be performed periodically (e.g., every minute, every second, etc.) or responsive to various events (e.g., after a predetermined timeout has expired, after a predetermined distance has been traveled, etc.). In another example, the telematics control unit 116 may set up a notification callback with the transceiver/modem 118, and may receive a callback notification responsive to the network address 120 having been changed.

Figure 2B:
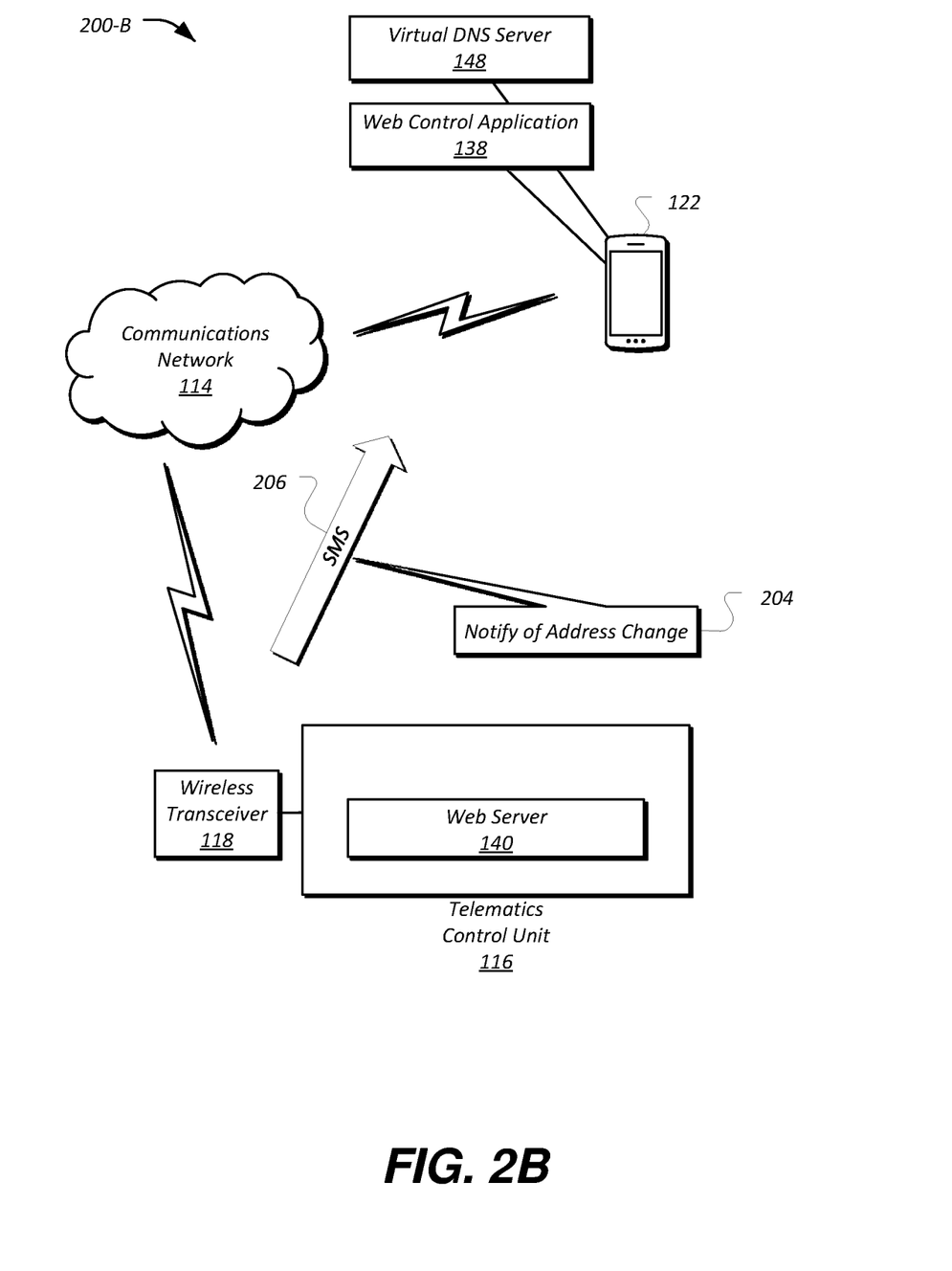
FIG. 2B illustrates an example diagram of the telematics control unit notifying the mobile device of the updated network address of the vehicle.

FIG. 2B illustrates an example diagram 200-B of the telematics control unit 116 notifying the mobile device 122 of the updated network address 120 of the vehicle 102. In an example, responsive to the determination of the updated network address 120 as illustrated in the diagram 200-A, the telematics control unit 116 sends a notification 204 of the network address 120 to the mobile devices 122 indicated by the paired device data 128. For instance, the paired device data 128 may include the phone numbers of mobile devices 122 that are authorized to access the features of the telematics control unit 116, and the telematics control unit 116 may send notification messages 206 via SMS to the phone numbers of each of the authorized mobile devices 122. The notification messages 206 may include the network address 120 of the transceiver/modem 118 of the vehicle 102. The notification messages 206 may also include an identifier of the vehicle 102 (e.g., the hostname 146 of the vehicle 102, the VIN or other identifier of the vehicle 102, etc.) to allow the virtual DNS server 148 of the mobile device 122 to understand for which of the vehicles 102 the updated network address 120 is intended.

Figure 2C:
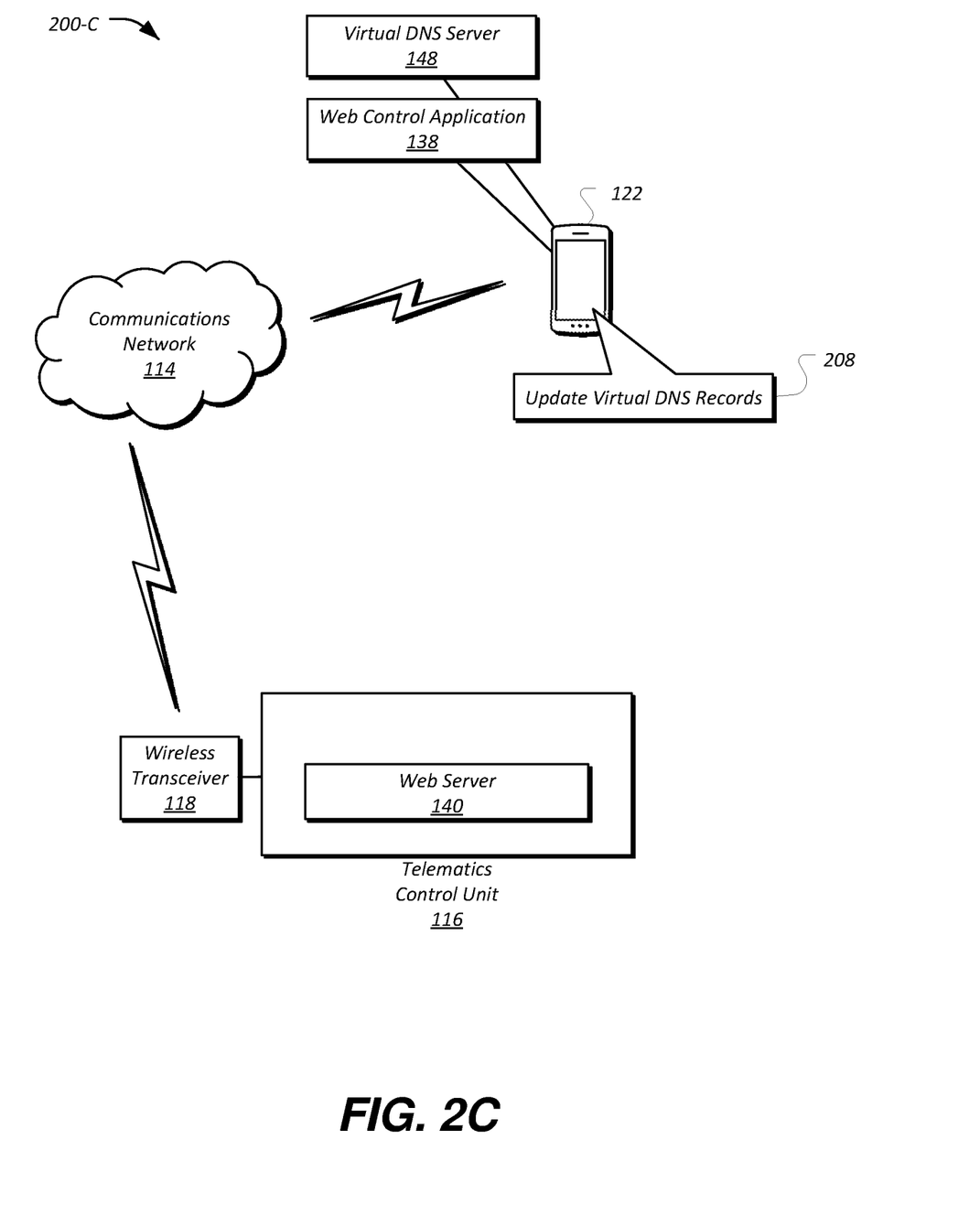
FIG. 2C illustrates an example diagram of the mobile device updating the virtual DNS server of the updated network address of the vehicle.

FIG. 2C illustrates an example diagram 200-C of the mobile device 122 updating the virtual DNS server 148 of the updated network address 120 of the vehicle 102. Responsive to receiving the notification message 206 as illustrated in the diagram 200-B, the receiving mobile device 122 may update 208 the hosts file or other mechanism of the mobile device 122 used to map hostnames 146 to network addresses 120 local to the mobile device 122.

Figure 2D:
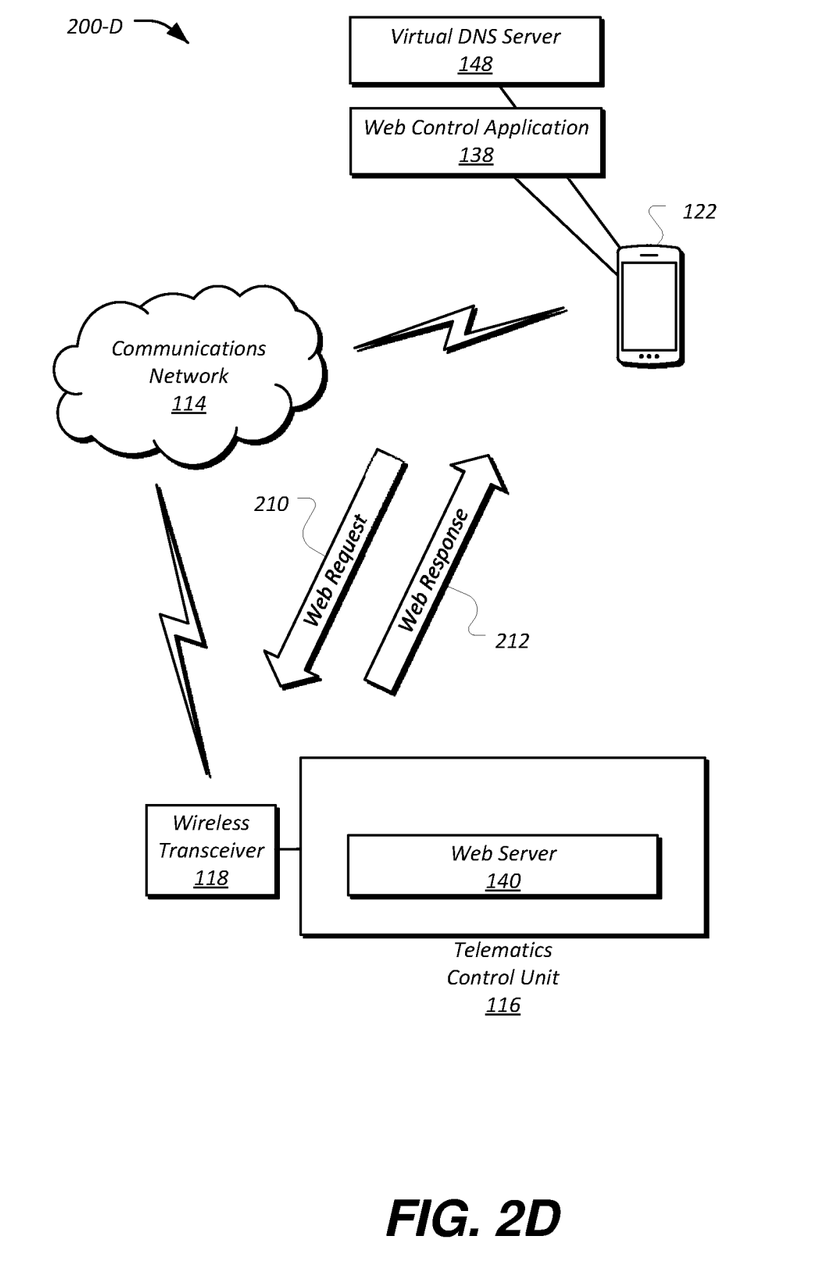
FIG. 2D illustrates an example diagram of the mobile device sending a web request to the vehicle using the updated network address.

FIG. 2D illustrates an example diagram 200-D of the mobile device 122 sending a web request 210 to the vehicle 102 using the updated network address 120. For example, the web control application 138 installed to the mobile device 122 may send the web request 210 to the web server 140 of the vehicle 102 to request, e.g., that a telematics function be performed or to execute an application installed to the web server 140. The web server 140 may further provide a web response 212 to the mobile device 122, which may be indicative of the result of the web request 212. Thus, by using the updated network address 120, the mobile device 122 may communicate with the web server 140 of the vehicle 102 despite changes in network address 120 experienced by the vehicle 102.

Figure 2E:
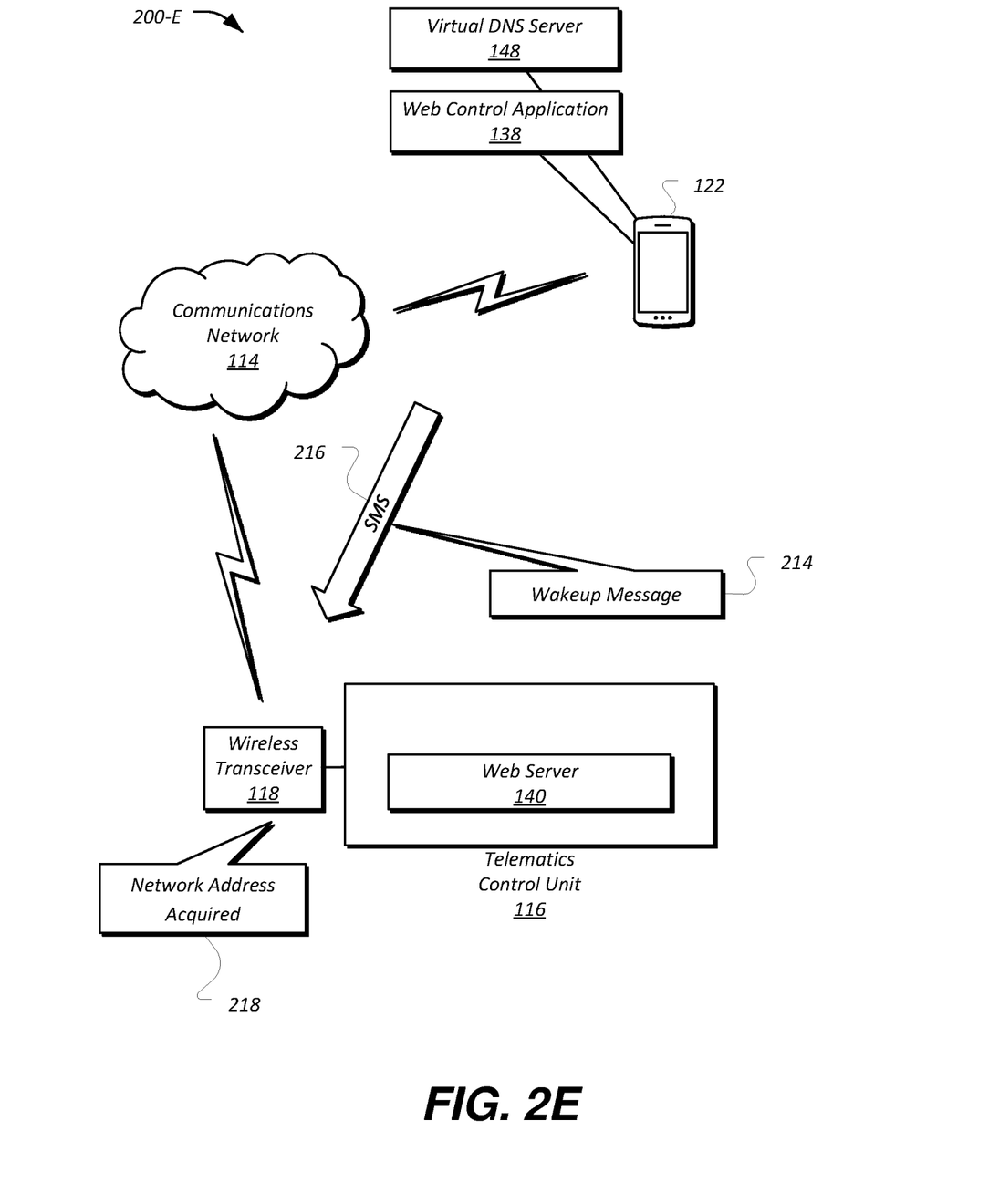
FIG. 2E illustrates an example diagram of the mobile device sending a wakeup message to the vehicle.

FIG. 2E illustrates an example diagram 200-E of the mobile device 122 sending a wakeup message 214 to the vehicle 102. As mentioned above, to save battery charge or to meet key-off load requirements, the vehicle 102 may discontinue operation of the web server 140 during certain conditions, such as when the vehicle 102 is off. In some cases, the user may desire to send a web request 210 to be processed by the vehicle 102 when the web server 140 is in a deactivated state. To re-active the web server 140, a wake-up message 214 may be sent to the telematics control unit of the vehicle 102. In an example, the mobile device 122 may attempt to form a network connection to the on-board web server 140 of the vehicle 102, and if the web server 140 does not respond within a predetermined timeout period (e.g., one minute, three minutes, etc.), the mobile device 122 may send the wake-up message 214 to the vehicle 102. The wake-up message 214 may be a short message service (SMS) message 216 or other message sent to the in-vehicle modem 118 over a connection other than the inactive connection used by the web server 140. Responsive to receipt of the wake-up message 214, the telematics control unit 116 may wake up the on-board web server 140, which may acquire a network address 120.

The telematics control unit 116 may further send a return message in response to the wake-up message 214, e.g., when the web server 140 is re-activated and available for use. This return message may be, as one example, the notification message 206 discussed above with respect to the diagram 200-B. Upon receipt of the return message, the mobile device 122 may be informed that the web server 140 is reactivated and available for use by the mobile device 122. Accordingly, the mobile device 122 may, responsive to receipt of the return message, send the web request 210 to the vehicle 102.

Figure 3A:
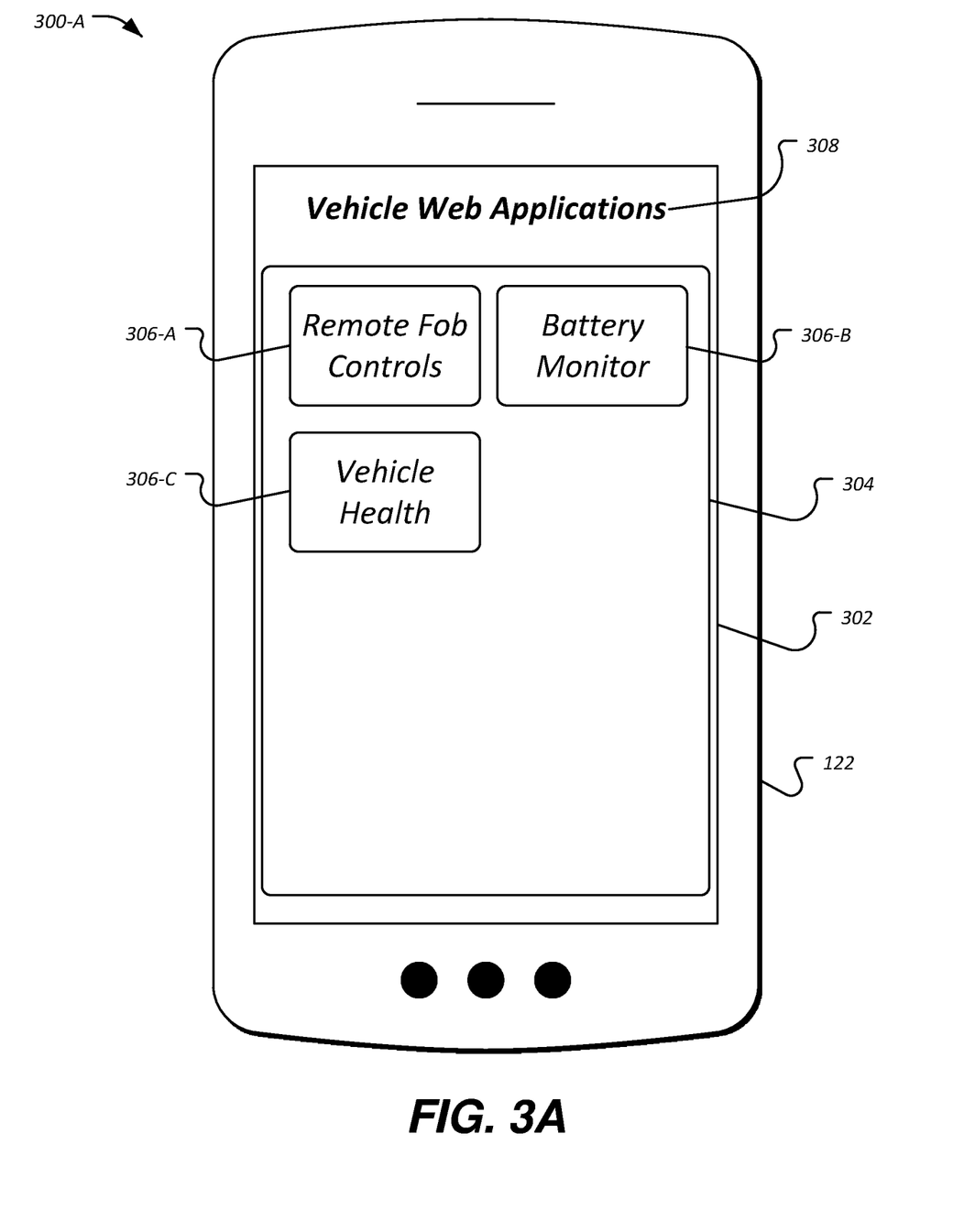
FIG. 3A illustrates an example user interface of the access portal to the web server of the vehicle.

FIG. 3A illustrates an example user interface 300-A of the access portal to the web server 140 of the vehicle 102. The user interface 300-A may be displayed on a screen or other display 302 of the mobile device 122, and may include an application listing 304 of one or more applications installed to and available on the web server 140. The application listing 304 may be retrieved by the web control application 138 from the web server 140 once the mobile device 122 is authorized to use the web server 140. As some non-limiting examples, the application listing 304 may include a fob controls application 306-A providing lock and unlock telematics functionality, a battery monitor application 306-B providing battery state of charge telematics functionality, and a vehicle health application 306-C providing vehicle 102 diagnostics telematics functionality. It should be noted that these are only examples, and more, fewer, and different applications 306 may be available. The user interface 300-A may also include a title 308 (e.g., a title of content provided by the web server 140) indicating to the user that the application listing 304 is of vehicle web applications available for use by the user.

A user of the user interface 300-A may touch or otherwise select from the application listing 304 to invoke the corresponding web applications. In an example, the elements of the application listing 304 may be implemented as hypertext markup language (HTML) controls (e.g., buttons, a list, etc.) that, when selected, submit information to the web server 140 indicative of which function was requested. In another example, the elements of the application listing 304 may include Java controls, UIKit controls, or another form of user interface that may be hosted by the web server 140 and provided to the mobile device 122 to be rendered by the web control application 138 of a mobile device 122 to the display 302 for access by the user.

Figure 3B:
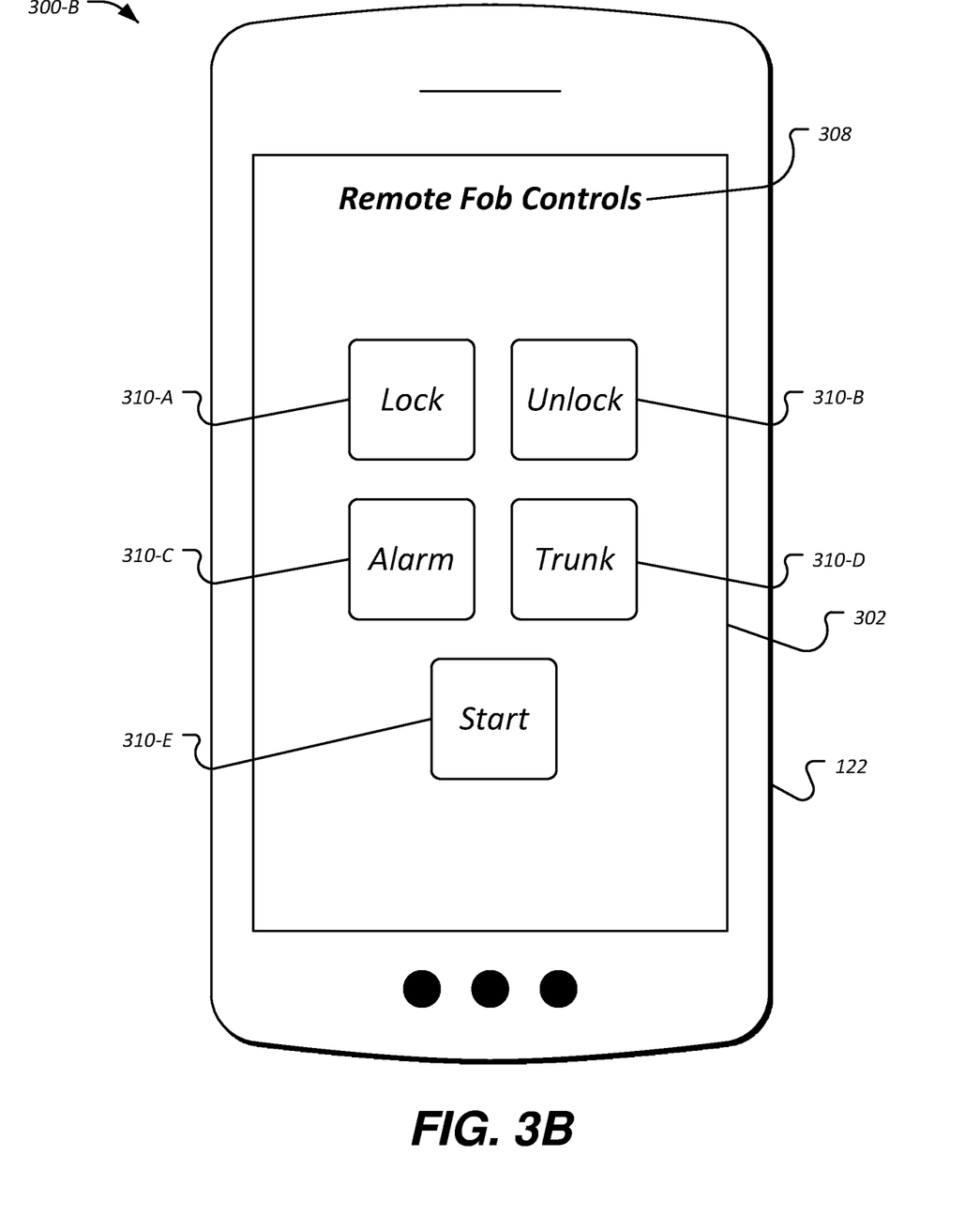
FIG. 3B illustrates an example user interface of an application of the access portal to the web server of the vehicle.

FIG. 3B illustrates an example user interface 300-B of an application of the access portal to the web server of the vehicle. In an example, the user interface 300-B may be displayed on the display 302 of the mobile device 122 responsive to use selection of one of the applications listed in the application listing 304 of the access portal. As shown, the user interface 300-B displays telematics functions of the fob controls application 306-A, e.g., responsive to user selection of fob controls application 306-A from the application listing 304.

The example fob controls application 306-A includes a set of controls 310 that may be used to invoke key fob-style telematics functions of the vehicle 102. These controls may include a lock control 310-A that, when selected, requests that the vehicle 102 doors be locked, an unlock control 310-B that, when selected, requests that the vehicle 102 doors be unlocked, an alarm control 310-C that, when selected, requests that the vehicle 102 alarm be invoked, an trunk release control 310-D that, when selected, requests that the vehicle 102 truck be unlatched, and a start control 310-E that, when selected, requests that the vehicle 102 engine be started. Similar to as discussed above, the controls 310 may be HTML controls provided in web content from the web server 140 that, when selected, cause the web control application 138 of a mobile device 122 to submit information to the web server 140 indicative of which function was requested. Additionally or alternately, the controls 310 may include Java controls, UIKit controls, or another form of user interface that may be rendered by the web control application 138 of a mobile device 122 to the display 302 for access by the user. The user web requests 210 to perform the telematics functions may be received by the web server 140, and processed such as described above with respect to FIGS. 2A-2E.

Figure 4:
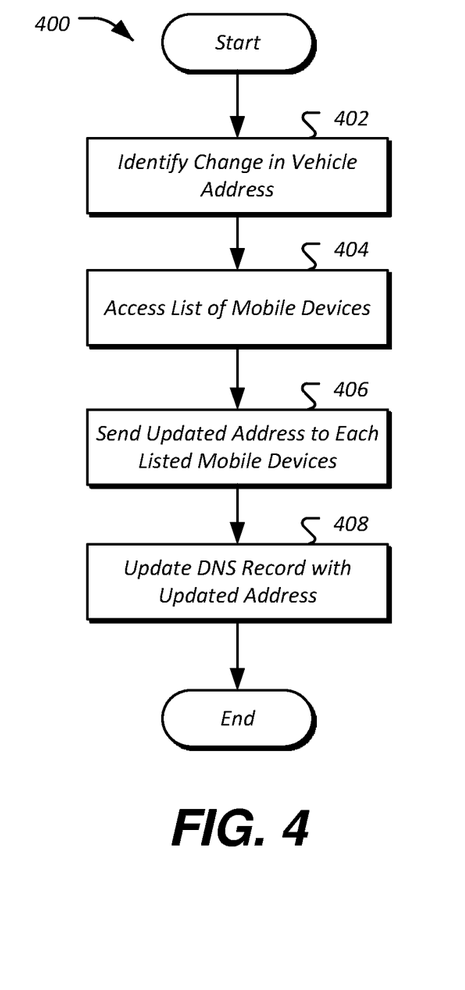
FIG. 4 illustrates an example process for updating DNS records of an updated network address of the vehicle.

FIG. 4 illustrates an example process 400 for updating DNS records of an updated network address 120 of the vehicle 102. In an example, the process 400 may be performed by the vehicle 102 of FIG. 1 including the telematics control unit 116 and modem 118.

At operation 402, the vehicle 102 identifies a change in the network address 120 of the vehicle 102. An example identification is illustrated above with respect to FIG. 2A. At 404, the vehicle 102 accesses the paired device data 128 to identify any mobile devices 122 to be updated with the network address 120. At operation 406, the vehicle 102 sends the updated network address 120 to the identified mobile devices 122. An example is illustrated above with respect to FIG. 2B.

At 408, the vehicle 102 sends the updated network address 120 to the domain name server 142 to update the DNS records 144. In an example, the telematics control unit 116 may automatically send a DNS record change message over the communications network 114 to the domain name server 142. The DNS record change message may indicate the new network address 120 of the vehicle 102 and the hostname 146 of the vehicle 102. Responsive to receipt by the domain name server 142, the domain name server 142 may update the network address 120 associated with the hostname 146 of the vehicle 102. After operation 408, the process 400 ends.

Figure 5:
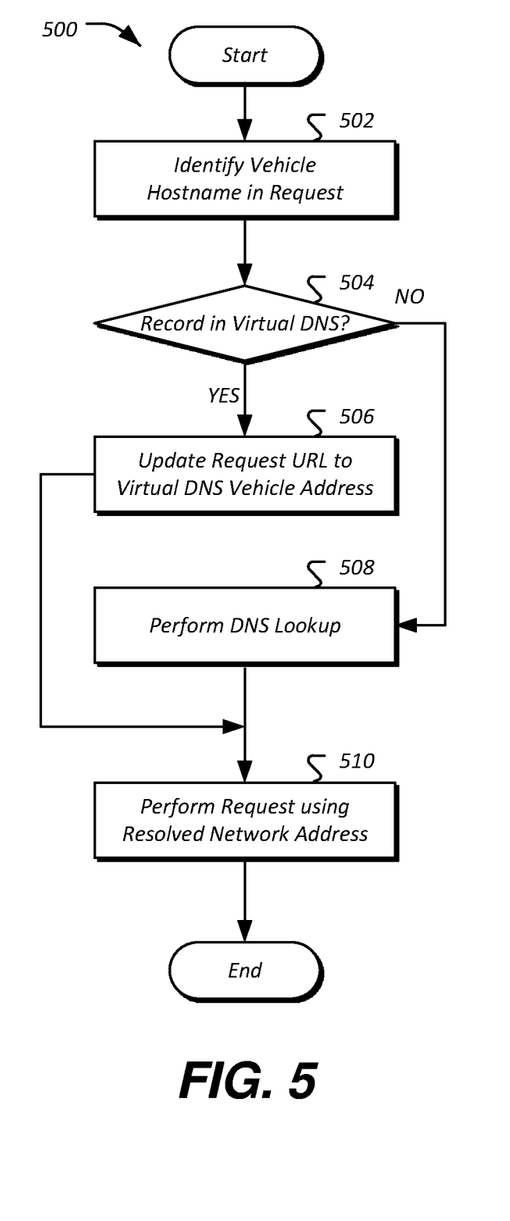
FIG. 5 illustrates an example process for sending a web request from a mobile device to the vehicle.

FIG. 5 illustrates an example process 500 for sending a web request 210 from a mobile device 122 to the vehicle 102. In an example, the process 50 may be performed by the mobile device 122 of FIG. 1 including the web control application 138 and virtual DNS server 148.

At 502, the vehicle 102 identifies a vehicle 102 hostname 146 in a request. In an example, the user of the mobile device 122 may utilize the web control application 138 to send a message to the vehicle 102, where the message is addressed to the vehicle 102 using the hostname 146. Responsive to the request, the virtual DNS server 148 may identify that the hostname 146 is included in the request by analyzing the request. For instance, the virtual DNS server 148 may determine that the address is specified by a hostname 146 and not by a network address 120.

At operation 504, the vehicle 102 determines whether the hostname 146 is one for which a record exists in the virtual DNS server 148. In an example, the virtual DNS server 148 may compare the hostname 146 to a hosts file or other store of local DNS information mapping hostnames 146 to corresponding network addresses 120. The virtual DNS server 148 may also perform further verifications of the hostname 146, e.g., to ensure that the hostname is of a format or pointing to a domain for vehicle 102 web browsers 140, before accessing the store of local DNS information. If the hostname 146 is for a vehicle 102 and matches an entry in the store of local DNS information, control passes to operation 506. Otherwise, control passes to operation 508.

At 506, the vehicle 102 replaces the hostname 146 with the network address 120 of the vehicle 102. In an example, the virtual DNS server 148 may replace the hostname 146 of the request with the corresponding network addresses 120 obtained from the local DNS information mapping. After operation 506, control passes to operation 510.

At 508, the vehicle 102 accesses the domain name server 142 to resolve the hostname 146 into a network address 120. In an example, the virtual DNS server 148 may replace the hostname 146 of the request with the corresponding network addresses 120 obtained from the domain name server 142. After operation 508, control passes to operation 510.

At operation 510, the vehicle 102 performs the request of operation 502 using the resolved network address 120. Accordingly, by using the virtual DNS server 148, the vehicle 102 may continue to be accessible to the mobile device 122 regardless of whether the despite the actual DNS records 144 of the domain name server 142 not having been updated for the vehicle 102 having a web server 140 hosted at a dynamic network address 120.

Figure 6:
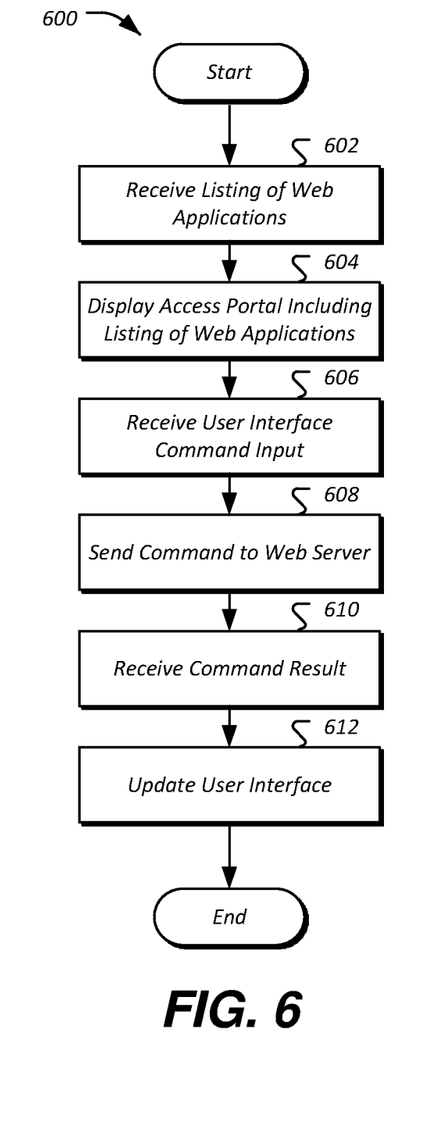
FIG. 6 illustrates an example process for displaying an access portal of the web server of the vehicle by the mobile device.

FIG. 6 illustrates an example process 600 for displaying an access portal of the web server 140 of the vehicle 102 by the mobile device 122. In an example, the process 600 may be performed by the web control application 138 of the mobile device 122.

At 602, the mobile device 122 receives the listing of web applications. In an example, the mobile device 122 may request the available applications over the web session with the web server 140 established at operation 510. At operation 604, the mobile device 122 displays the access portal including the listing of web applications. An example access portal displayed by the web control application 138 illustrating the application listing 304 is described above with respect to FIG. 3A.

At operation 606, the mobile device 122 receives user interface command input. In an example, a user may select one of the applications listed in the application listing 304 of the access portal, and may further select a telematics command from the selected application. An example user interface of an application is described above with respect to FIG. 3B.

In operations as represented by 608, the mobile device 122 sends the web request 210 to the vehicle 102. In an example, the web request 210 may be a command to lock or unlock doors from a key fob application. In another example, the web request 210 may be a request for battery state of charge from a battery status application. The vehicle 102 may accordingly receive and process the web request 210 sent by the web control application 138. At operation 610, the mobile device 122 receives a web response 212 from the vehicle 102. In an example, the command response 218 may indicate whether the vehicle 102 doors were successfully locked or unlocked. In another example, the web response 212 may indicate the current battery state of charge. At 612, the mobile device 122 updates the user interface. As some examples, the web control application 138 may update the user interface to indicate the current vehicle 102 lock status or state of charge. After operation 612, the process 600 ends.

Figure 7:
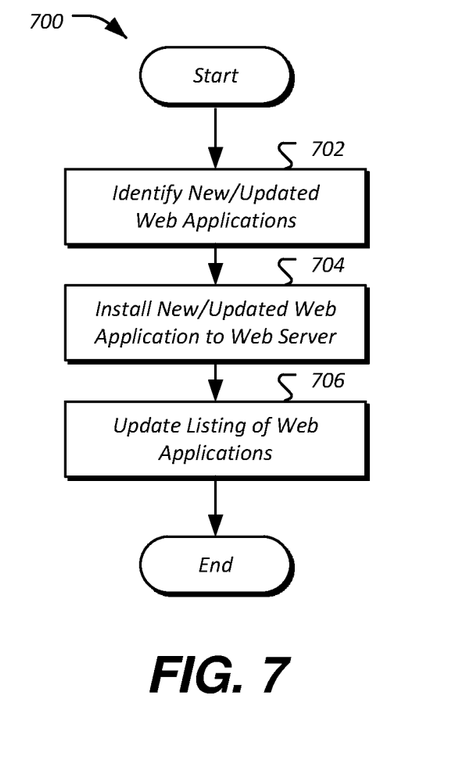
FIG. 7 illustrates an example process for adding web applications to the web server.

FIG. 7 illustrates an example process 700 for adding web applications to the web server 140. In an example, the process 700 may be performed by the web control application 138 of the mobile device 122 in communication with the web server 140 of the vehicle 102.

At operation 702, the web server 140 identifies new or updated web applications. In an example, the web server 140 may periodically query an application store for updates for currently-installed web applications. For instance, the web server 140 may provide identifiers of currently-installed web applications and currently version levels to the application store server, and may receive indications of which web applications have updates that are available. In another example, the user may identify one or more new applications to be installed to the web server 140. As one possibility, the user may browse the application store server using the mobile device 122, and may select one or more web applications to be installed to the web server 140. For instance, the requests to install the web applications may be sent as web requests 210 to the web server 140 when the mobile device 122 is connected to the web server 140 in a web session.

At 704, the web server 140 installs new or updated web applications to the web server 140. For example, the web server 140 may download the new or updates web applications from the application store, and may install the applications to the web server 140. At operation 706, the web server 140 updates the listing of web applications. Thus, the new or updated web applications may become available in the access portal application listing 304. After operation 706, the process 700 ends.

In general, computing systems and/or devices, such as the ECUs 106, telematics control unit 116, mobile device 122, filter 124, and domain name server 142, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices, such as the controllers 106, telematics control unit 116, mobile device 122, filter 124, and address resolution server 140 generally include computer-executable instructions that may be executable by one or more processors of the computing devices. Computer-executable instructions, such as those of the web control application 138, may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as the data stored by the domain name server 142, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the controllers 106, telematics control unit 116, mobile device 122, filter 124, and address resolution server 140 may be such computer program products (e.g., the web control application 138). In some example, these computer program products may be provided as software that when executed by one or more processors provides the operations described herein. Alternatively, the computer program products may be provided as hardware or firmware, or combinations of software, hardware and/or firmware.

What is claimed is:

1. A system comprising:
   a mobile device including a processor, a memory storing a virtual domain name server and a web control application, and a transceiver, programmed to
   identify, using the web control application executed by the processor, a web request, to be sent via the transceiver, as including a hostname of a vehicle available for communication with the transceiver over a wide-area communications network;

access the virtual domain name server executed by the processor to determine whether the mobile device locally maintains a network address for the hostname in the memory;

if so, initiate a web connection using the web control application to the network address retrieved by the virtual domain name server, and otherwise, initiate the web connection using the web control application to a network address resolved from the hostname via a remote domain name server available for communication with the transceiver over the wide-area communications network;

receive a changed network address for the hostname of the vehicle via a short message service (SMS) message addressed to a phone number of the mobile device; and update a network address mapping of the virtual domain name server local to the mobile device to indicate the changed network address as associated with the hostname.

2. The system of claim 1, wherein the mobile device is further programmed to:

display an access portal including a listing of telematics web applications installed to a web server of the vehicle; and access one of the telematics web applications via the web connection to request the vehicle to perform a telematics command.

3. The system of claim 2, wherein the one of the telematics web applications is a key fob application and the telematics command is a door lock or unlock command.

4. The system of claim 2, wherein the one of the telematics web applications is an electric vehicle application, and the telematics command is to request a current state of charge of a battery of the vehicle.

5. The system of claim 1, wherein the mobile device is further programmed to identify the hostname as being the hostname of a vehicle by comparing the hostname to a listing of vehicle hostnames programmed to the vehicle.

6. The system of claim 1, wherein the mobile device is further programmed to identify the hostname as being the hostname of the vehicle by determining that the hostname references a vehicle-specific top-level domain programmed to the mobile device.

7. The system of claim 1, wherein the network address is one of an Internet Protocol version 6 (IPv6) address or Internet Protocol version 4 (IPv4) address.

8. A method comprising:

identifying, by a mobile device, a hostname of a web request as being a vehicle hostname;

accessing a virtual domain name server executed by the mobile device to identify a network address for the vehicle hostname;

initiating a web connection by the mobile device to the network address to contact a web server executed by the vehicle;

displaying an access portal including a listing of telematics web applications installed to the web server of the vehicle;

accessing one of the telematics web applications via the web connection to request the vehicle to perform a telematics command;

receiving a changed network address for the hostname is a short message service (SMS) message addressed to a phone number of the mobile device; and updating a network address mapping of the virtual domain name server local to the mobile device to indicate the chanced network address as associated with the hostname.

9. The method of claim 8, wherein the vehicle hostname includes a vehicle make, a vehicle model, a vehicle year, and a vehicle name.

10. The method of claim 8, wherein the network address is one of an Internet Protocol version 6 (IPv6) address or Internet Protocol version 4 (IPv4) address.

11. The method of claim 8, further comprising identifying the hostname as being the hostname of the vehicle by comparing the hostname to a listing of vehicle hostnames programmed to the mobile device.

12. A method comprising:

receiving, by a mobile device in a short message service (SMS) message addressed to a phone number of the mobile device, a network address for a hostname of a vehicle available for communication with a transceiver of the mobile device over a wide-area communications network;

updating a network address mapping of a virtual domain name server executed by the mobile device to indicate the network address as being a wide-area communication network address corresponding to the hostname;

identifying, using a web control application executed by the mobile device, a web request, to be sent via the transceiver, as including the hostname;

accessing the virtual domain name server to determine whether the mobile device locally maintains a network address for the hostname in a memory of the vehicle; and if so, initiate a web connection to a web server executed by the vehicle using the web control application to the network address retrieved by the virtual domain name server, and otherwise, initiate the web connection to the web server of the vehicle using the web control application to a network address resolved from the hostname via a remote domain name server available for communication with the transceiver over the wide-area communications network;

displaying, by the mobile device, an access portal including a listing of telematics web applications installed to the web server of the vehicle; and accessing one of the telematics web applications of the web server of the vehicle via the web connection to request the vehicle to perform a telematics command.

* * * * *